United States Patent
Wang

(10) Patent No.: US 10,698,863 B2
(45) Date of Patent: Jun. 30, 2020

(54) METHOD AND APPARATUS FOR CLEARING DATA IN CLOUD STORAGE SYSTEM

(71) Applicant: BEIJING BAIDU NETCOM SCIENCE AND TECHNOLOGY CO., LTD., Beijing (CN)

(72) Inventor: Jiangyong Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 790 days.

(21) Appl. No.: 15/374,923

(22) Filed: Dec. 9, 2016

(65) Prior Publication Data
US 2018/0081894 A1   Mar. 22, 2018

(30) Foreign Application Priority Data

Sep. 22, 2016  (CN) .......................... 2016 1 0844370

(51) Int. Cl.
*G06F 7/00*      (2006.01)
*G06F 17/00*     (2019.01)
(Continued)

(52) U.S. Cl.
CPC ........ *G06F 16/162* (2019.01); *G06F 16/1727* (2019.01); *G06F 16/24544* (2019.01)

(58) Field of Classification Search
CPC ......... G06F 17/30117; G06F 17/30466; G06F 17/30138
(Continued)

(56) References Cited

U.S. PATENT DOCUMENTS 6,957,222 B1 *  10/2005  Ramesh ............ G06F 16/24544
8,397,083 B1 *   3/2013  Sussland ............. H04L 67/1097
                                                      380/277
(Continued)

FOREIGN PATENT DOCUMENTS

CN      101866359 A     10/2010
CN      102193952 A      9/2011
(Continued)

OTHER PUBLICATIONS

First Office Action and search report from CN app. No. 201610844370.2, dated Apr. 3, 2019, with English translation from Global Dossier.
(Continued)

*Primary Examiner* — Binh V Ho
(74) *Attorney, Agent, or Firm* — Ladas & Parry, LLP

(57) ABSTRACT

An object of the present invention is to provide a method and apparatus for clearing data in a cloud storage system. The method according to the present invention comprises the following steps: deleting meta information of a data slice corresponding to the file upon detecting that a user is deleting a file; wherein the method comprises the following steps: exporting all data slices to be processed when data needs to be cleared; by traversing each file in the meta information, determining each data slice that may be accessed through the meta information and thereby obtaining corresponding access data information; based on the access data information, determining the data to be cleared in said all data slices to perform data clearing operation for the data to be cleared. The present invention has the following advantages: avoiding likely deletion failure in the conventional manner of directly deleting the data information of the file, thereby reducing the storage space occupied by trash data and improving a resource utilization rate and a load level of the system.

15 Claims, 2 Drawing Sheets

(51) Int. Cl.
*G06F 16/16* (2019.01)
*G06F 16/17* (2019.01)
*G06F 16/2453* (2019.01)

(58) Field of Classification Search
USPC ........................................................ 707/692
See application file for complete search history.

(56) References Cited

U.S. PATENT DOCUMENTS

| | | | | |
|---|---|---|---|---|
| 9,990,253 | B1* | 6/2018 | Rajimwale | G06F 11/1435 |
| 2006/0200470 | A1* | 9/2006 | Lacapra | G06F 16/10 |
| 2007/0013963 | A1* | 1/2007 | Nakamura | H04N 1/00127 |
| | | | | 358/403 |
| 2009/0180763 | A1* | 7/2009 | McCarthy | G11B 27/034 |
| | | | | 386/326 |
| 2010/0161897 | A1* | 6/2010 | Lee | G06F 3/061 |
| | | | | 711/112 |
| 2010/0332454 | A1* | 12/2010 | Prahlad | G06F 3/0649 |
| | | | | 707/654 |
| 2014/0040331 | A1* | 2/2014 | Takaoka | G06F 3/0605 |
| | | | | 707/827 |
| 2014/0089272 | A1* | 3/2014 | Biswas | G06F 16/958 |
| | | | | 707/692 |
| 2015/0032702 | A1* | 1/2015 | Gokhale | G06F 11/1435 |
| | | | | 707/692 |
| 2015/0234879 | A1 | 8/2015 | Baldwin et al. | |
| 2015/0261749 | A1* | 9/2015 | Ten-Pow | G06F 16/174 |
| | | | | 707/692 |
| 2015/0370643 | A1* | 12/2015 | Rueger | G06F 11/1446 |
| | | | | 707/652 |

FOREIGN PATENT DOCUMENTS

| | | | |
|---|---|---|---|
| CN | 103678337 | A | 3/2014 |
| CN | 104156474 | A | 11/2014 |
| CN | 105141685 | A | 12/2015 |
| CN | 105912664 | A | 8/2016 |

OTHER PUBLICATIONS

Second Office Action and supplementary search report from CN app. No. 201610844370.2, dated Jul. 15, 2019, with machine English translation from Google Translate.

* cited by examiner

METHOD AND APPARATUS FOR CLEARING DATA IN CLOUD STORAGE SYSTEM

CROSS-REFERENCE TO RELATED APPLICATIONS

The present application claims the priority of Chinese Patent Application No. 201610844370.2, filed on Sep. 22, 2016, with the title of "Method and apparatus for clearing data in cloud storage system", the disclosure of which is hereby incorporated herein by reference.

FIELD OF THE INVENTION

The present invention relates to the technical field of computers, and particularly to a method and apparatus for clearing data in a cloud storage system.

BACKGROUND OF THE INVENTION

Object storage service provides stable, safe, efficient and highly-expandable cloud storage service, not only provides service directly to users but also provides strong support for higher-level services, and is a very important fundamental service in public cloud service. According to the object storage service, generally an object is classified into two portions for storage, namely, meta and data. Actual data of the object is stored in data, and meta information of the object and mapping to data are maintained in meta. In fact, deletion of the object is substantively deletion of meta and data mapped by it. Object storage provides highly reliable storage service to the user with high-specification server resources and a lower price level. Hence, how to ensure efficient use of server resources and reduce the demand for server resources is important content for lowering the costs and thereby achieving profits in cloud storage service.

In current technical solutions, a data deletion operation is generally direct deletion, i.e., after the user initiates an operation of deleting the object, mata and data of the object are directly deleted. However, this manner has the following drawbacks: 1) when the object is deleted, deletion logics are diverse and complicated; during processing, the deletion is apt to failure due to factors of the program itself or hardware so that a lot of garbage data that cannot be deleted forever occurs in the system such that the storage space is wasted seriously, consumption duration is long and the user's experience is undesirable; 2) as for the manner of directly deleting the meta and data of the object, if the user initiates a deletion request, a result can be returned to the user only after the system completes thorough clearing of all meta and data, so the whole procedure spends a longer time period; 3) a larger influence is exerted on the storage system on the whole; since the server resources are limited, if there are a lot of direct deletion operations, they will consume a lot of server resources so that the system does not have enough resources to provide the user with other more valuable operations such as uploading and downloading.

SUMMARY OF THE INVENTION

An object of the present invention is to provide a method and apparatus for clearing data in a cloud storage system.

According to an aspect of the present invention, there is provided a method for clearing data in a cloud storage system, wherein the clearing apparatus slices each user's data into a plurality of independent data slices according to a specific size for storage, the method comprises the following steps:

deleting meta information of a data slice corresponding to the file upon detecting that a user is deleting a file;

wherein, the method comprises the following steps:

exporting all data slices to be processed when data needs to be cleared;

by traversing each file in the meta information, determining each data slice that may be accessed through the meta information and thereby obtaining corresponding access data information;

based on the access data information, determining the data to be cleared in said all data slices to perform data clearing operation for the data to be cleared According to another aspect of the present invention, there is further provided an apparatus for clearing data in a cloud storage system, wherein the cloud storage system stores data corresponding to multiple users, and the cloud storage system slices each user's data into a plurality of independent data slices according to a specific size for storage, the clearing apparatus comprising:

means for deleting meta information of a data slice corresponding to the file upon detecting that a user is deleting a file;

wherein, the clearing apparatus comprises:

means for exporting all data slices to be processed when data needs to be cleared;

means for, by traversing each file in the meta information, determining each data slice that may be accessed through the meta information and thereby obtaining corresponding access data information;

means for, based on the access data information, determining the data to be cleared in said all data slices to perform data clearing operation for the data to be cleared.

According to a further aspect of the present invention, there is provided a cloud storage system which comprises one or more cloud storage devices, the cloud storage devices comprising the clearing apparatus according to the present invention.

As compared with the prior art, the present invention has the following advantages: deleting the meta information of the corresponding file when the user initiates the deletion operation and performing clearing in the cloud storage system avoids likely deletion failure in the conventional manner of directly deleting the data information of the file, thereby reducing the storage space occupied by trash data and improving a resource utilization rate and a load level of the system; furthermore, according to the solution of the present invention, all data are distributed in a distributed multi-thread manner to a plurality of nodes for processing respectively, and processing progress and result of each node is managed on the central node to uniformly obtain the execution result thereof, thereby avoiding a lot of inter-device interaction generated upon determining data to be cleared, reducing network consumption, lessening the load of devices and improving the efficiency.

BRIEF DESCRIPTION OF DRAWINGS

Other features, objects and advantages of the present invention will be made more apparent by reading through detailed description of unrestrictive embodiments with reference to the following figures.

Identical or like reference signs in the figures represent identical or like parts.

DETAILED DESCRIPTION OF PREFERRED EMBODIMENTS

The present invention is described in more details with reference to figures.

Figure 1:
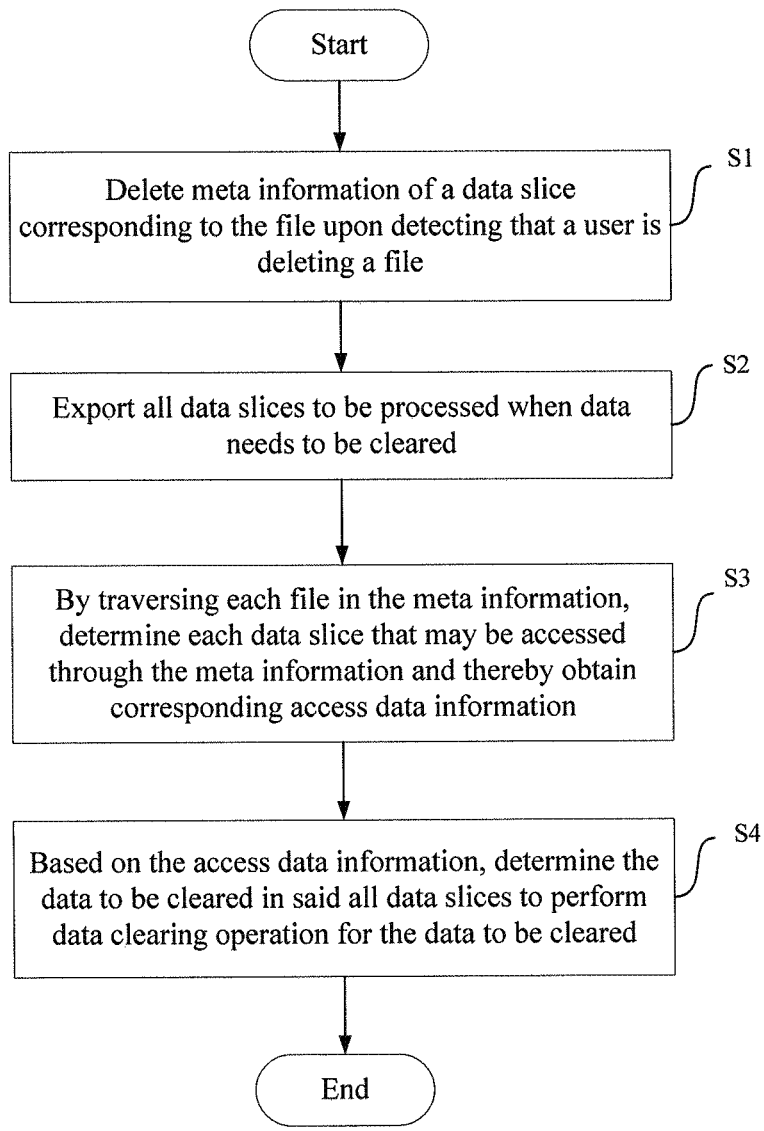
FIG. 1 illustrates a flow chart of a method of clearing data in a cloud storage system according to the present invention.

FIG. 1 illustrates a flow chart of a method of clearing data in a cloud storage system according to the present invention. The method according to the present invention comprises step S1, step S2, step S3 and step S4.

The method according to the present invention is implemented by a clearing apparatus included in a cloud storage apparatus. The cloud storage apparatus includes various network devices for providing cloud storage service.

The network devices include but are not limited to a single network server, a server group comprised of a plurality of network servers, or cloud based on cloud computing and comprised of many hosts or network servers, wherein cloud computing is a kind of distributed computing and implemented by a super virtual computer comprised of a group of loosely-coupled computer sets. The network where the network devices lie includes but is not limited to the Internet, wide area network, metropolitan area network, local area network, VPN network and the like.

It needs to be appreciated that the network devices and networks are only exemplary, and other current or to be-developed user equipment, network devices and networks also apply to the present invention, should also be included in the protection scope of the present invention and included herein by reference.

Referring to FIG. 1, in step S1, upon detecting that a user is deleting a file, the clearing apparatus deletes meta information of a data slice corresponding to the file.

The meta information includes various data that may be used in a database to describe data and their environment.

According to a first example of the present invention, the clearing apparatus is included in a Baidu Object Storage (BOS) system. Furthermore, the cloud storage system employs Baidu's molaDB database, and the cloud storage system slices each user's data into a plurality of independent data slices according to a specific size for storage, and furthermore, the BOS system stores a copy of the meta information of each file object respectively in the Mola system and MySQL system. Upon detecting that the user is deleting a file, the clearing apparatus deletes the meta information of the data slice corresponding to the file, and meanwhile retains its data information. Upon completion of deletion of meta information, a result of deletion operation of this time is returned to the user.

Further referring to FIG. 1, in step S2, when data needs to be cleared, the clearing apparatus exports all data slices to be processed.

Preferably, when the user manually begins data clearing operation or after a specific cycle, the clearing apparatus exports all data slices to be processed.

Then, in step S3, by traversing each file in the meta information, the clearing apparatus determines each data slice that may be accessed through the meta information and thereby obtains corresponding access data information.

Preferably, after completion of execution of the step S2 and after a predetermined time period, operation of step S3 is executed.

Preferably, the access data information comprises listing information, and the step S3 comprises step S301 (not shown).

In step S301, by traversing each file in the meta information, the clearing apparatus obtains the listing information of each data slice that may be accessed through the meta information.

Specifically, the clearing apparatus may directly obtains the listing information of each portion of the file object.

If a size of a file object exceeds a predetermined threshold, the clearing apparatus respectively obtains a portion of listing information corresponding to each portion of the file object; then, the clearing apparatus merges the obtained portions of listing information to thereby obtain the listing information of each data slice corresponding to the file object.

Preferably, if the listing information of a file object can be obtained only by performing secondary search, the clearing apparatus, by performing the secondary search operation, adds the listing information of each portion of the file object one by one in general listing information.

Preferably, the cloud storage system stores a small file smaller than the predetermined threshold in the meta information. By traversing file objects except for the small file in the meta information, the clearing apparatus determines each data slice that may be accessed through the meta information.

Further to illustrate the foregoing first example, the clearing apparatus stores files objects smaller than 1 M in the meta information and thereby does not traverse these file objects smaller than 1 M in step S3. The clearing apparatus classifies all file objects into three types, namely, common type (larger than 1 M and smaller than or equal to 1 G), composed type (larger than 1 G and smaller than or equal to 20 G) and super type (larger than 20 G), according to the size of files, and the listing information of the super-type file objects can be obtained by performing secondary search. The clearing apparatus traverses files in the meta information according to the following rule: for the common-type file object, directly obtaining the listing information of each portion of the file object; for the composed-type file object, the clearing apparatus respectively obtains the portion of listing information corresponding to each portion of the file object and merges the portions of listing information, thereby obtaining the listing information of each data slice corresponding to the file object; as for the super-type file object, adds the listing information of each portion of the file object one by one in general listing information by performing the secondary search operation.

When data clearing operation of last time has passed one day, the clearing apparatus exports all data slices to be processed in step S2 as a set A. Then, the clearing apparatus, based on the above rule and by traversing each file in the meta information stored in the Mola system, obtains listing information slice_list1 of each data slice that may accessed through the meta information, and by traversing all src fields in a Reference table of the MYSQL system, obtains listing information slice_list2 of each data slice that may accessed, and considers the slice_list1 and slice_list2 as data access information.

Further referring to FIG. 1, in step S4, the clearing apparatus, based on the access data information, determines the data to be cleared in said all data slices to perform data clearing operation for the data to be cleared.

Specifically, the clearing apparatus considers one or more data slices that cannot be accessed through the meta information among all data slices to be processed, as data to be cleared.

Preferably, the clearing apparatus determines the data to be cleared by comparing all data slices to be processed with said access data information and by performing left outer join operation.

According to a preferred embodiment of the present invention, the method further comprises step S5 (not shown in the figure).

In step S5, the clearing apparatus obtains information related to data slices that have already been uploaded by the user but not merged yet.

In step S4, if the determined data to be cleared includes one or more data slices that have already been uploaded by the user but not merged yet, the clearing apparatus determines not performing data clearing operation for said one or more data slices.

Illustration is further presented to the previous first example. When the user uploads a large file, BOS system provides three-step uploading to ensure that the uploading operation of the large file achieves a better effect. In the three-step uploading, the user first divides the data into multiple portions and uploads them in turn, and finally merges the uploaded multiple portions. If the user does not initiate the three-step uploading and the user does not delete these portions, these portions may be accessed in a MultiUpload Part in the BOS system. In step S5, the clearing apparatus obtains listing information slice_list3 of each data slice that may be accessed in the MultiUpload Part, and regards a total of data slices corresponding to the slice_list1, slice_list2 and slice_list3 as a set B. Then, the clearing apparatus, through the left outer join operation, determines data slices which are in the set A and not in the set B as data to be cleared, and thereby performs data clearing operation therefor.

Preferably, said step S4 further includes step 401 (not shown) and step S402 (not shown).

In step S401, the clearing apparatus may transfer and store the data to be cleared in a junk file, wherein the user may restore mis-deleted data slices in the junk file.

In step S402, the clearing apparatus deletes a data slice which is in the junk file and has already been stored for a time period exceeding a predetermined time period, to complete data clearing operation.

To further illustrate the aforesaid first example, the clearing apparatus transfers and stores data to be cleared to a trash table, and if there occurs mis-deletion, the mis-deleted data slices may be restored in the trash table. After a predetermined time period, the clearing apparatus clears content in the trash table to complete data clearing operation.

According to the method of the present invention, deleting the meta information of the corresponding file when the user initiates the deletion operation and performing clearing in the cloud storage system avoids likely deletion failure in the conventional manner of directly deleting the data information of the file, thereby reducing the storage space occupied by trash data and improving a resource utilization rate and a load level of the system.

According to a preferred embodiment of the present invention, the cloud storage system comprises a plurality of processing nodes working independently and a central node; when the method is executed by the clearing apparatus included in the processing nodes, and the method further comprises step S6 (not shown).

In step S6, after completing execution of the data clearing operation, the clearing apparatus sends corresponding processing result information to a device as the central node so that the central node processes the processing result information from each processing node.

The processing result information may include identifier information, number information, clearing completion time and the like of data slices that have been cleared.

Figure 3:
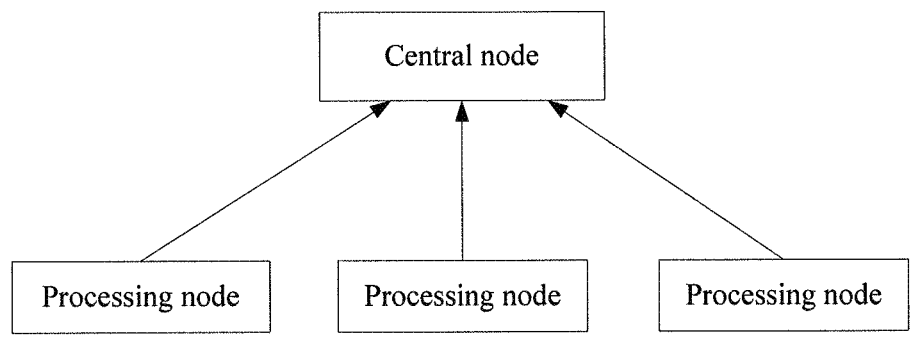
FIG. 3 illustrates an exemplary cloud storage system according to the present invention.

For example, FIG. 3 illustrates an exemplary cloud storage system according to the present invention. Referring to FIG. 3, the cloud storage system comprises three cloud storage devices as processing nodes, and one cloud storage device as the central node. After having completed execution of data clearing operation, the processing nodes send corresponding processing result information to the device as the central node so that the central node processes the processing result information from each processing node.

According to the method of the preferred embodiment, all data are distributed in a distributed multi-thread manner to a plurality of nodes for processing respectively, and processing progress and result of each node is managed on the central node to uniformly obtain the execution result thereof, thereby avoiding a lot of inter-device interaction generated upon determining data to be cleared, reducing network consumption, lessening the load of devices and improving the efficiency.

Figure 2:
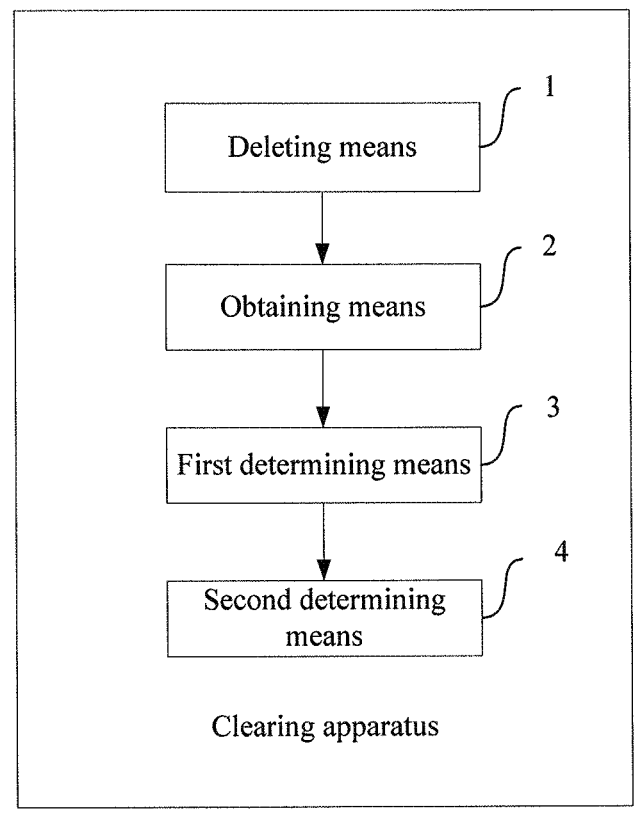
FIG. 2 illustrates a block diagram of an apparatus of clearing data in a cloud storage system according to the present invention.

FIG. 2 illustrates a block diagram of a clearing apparatus of clearing data in a cloud storage system according to the present invention.

The clearing apparatus according to the present invention comprises: means for deleting meta information of a data slice corresponding to the file upon detecting that a user is deleting a file (hereinafter referred to as "deleting means 1"); means for exporting all data slices to be processed when data needs to be cleared (hereinafter referred to as "exporting means 2"); means for, by traversing each file in the meta information, determining each data slice that may be accessed through the meta information and thereby obtaining corresponding access data information (hereinafter referred to as "first determining means 3"); means for, based on the access data information, determining the data to be cleared in said all data slices to perform data clearing operation for the data to be cleared (hereinafter referred to as "second determining means 4").

Referring to FIG. 2, upon detecting that a user is deleting a file, the deleting means 1 deletes meta information of a data slice corresponding to the file.

The meta information includes various data that may be used in a database to describe data and their environment.

According to a first example of the present invention, the clearing apparatus is included in a Baidu Object Storage (BOS) system. Furthermore, the cloud storage system employs Baidu's molaDB database, and the cloud storage system slices each user's data into a plurality of independent data slices according to a specific size for storage, and furthermore, the BOS system stores a copy of the meta information of each file object respectively in the Mola system and MySQL system. Upon detecting that the user is deleting a file, the deleting means 1 deletes the meta information of the data slice corresponding to the file, and meanwhile retains its data information. Upon completion of deletion of meta information, a result of deletion operation of this time is returned to the user.

Further referring to FIG. 2, when data needs to be cleared, the exporting means 2 exports all data slices to be processed.

Preferably, when the user manually begins data clearing operation or after a specific cycle, the exporting means 2 exports all data slices to be processed.

Then, by traversing each file in the meta information, the first determining means 3 determines each data slice that may be accessed through the meta information and thereby obtains corresponding access data information.

Preferably, after completion of execution of the operation of the exporting means 2 and after a predetermined time period, operation of the first determining means 3 is executed.

Preferably, the access data information comprises listing information, and the first determining means 3 comprises means for, by traversing each file in the meta information, obtaining the listing information of each data slice that may be accessed through the meta information (not shown in the figure; hereinafter referred to as "listing obtaining means").

The listing obtaining means may, by traversing each file in the meta information, obtain the listing information of each data slice that may be accessed through the meta information.

Specifically, the listing obtaining means may directly obtains the listing information of each portion of the file object.

If a size of a file object exceeds a predetermined threshold, the listing obtaining means respectively obtains a portion of listing information corresponding to each portion of the file object; then, the listing obtaining means merges the obtained portions of listing information to thereby obtain the listing information of each data slice corresponding to the file object.

Preferably, if the listing information of a file object can be obtained only by performing secondary search, the listing obtaining means, by performing the secondary search operation, adds the listing information of each portion of the file object one by one in general listing information.

Preferably, the cloud storage system stores a small file smaller than the predetermined threshold in the meta information. By traversing file objects except for the small file in the meta information, the first determining means 3 determines each data slice that may be accessed through the meta information.

Further to illustrate the foregoing first example, the first determining means 3 stores files objects smaller than 1 M in the meta information and thereby does not traverse these file objects smaller than 1 M. The clearing apparatus classifies all file objects into three types, namely, common type (larger than 1 M and smaller than or equal to 1 G), composed type (larger than 1 G and smaller than or equal to 20 G) and super type (larger than 20 G), according to the size of files, and the listing information of the super-type file objects can be obtained by performing secondary search. The clearing apparatus traverses files in the meta information according to the following rule: for the common-type file object, directly obtaining the listing information of each portion of the file object; for the composed-type file object, the clearing apparatus respectively obtains the portion of listing information corresponding to each portion of the file object and merges the portions of listing information, thereby obtaining the listing information of each data slice corresponding to the file object; as for the super-type file object, adds the listing information of each portion of the file object one by one in general listing information by performing the secondary search operation.

When data clearing operation of last time has passed one day, the exporting means 2 exports all data slices to be processed as a set A. Then, the listing obtaining means, based on the above rule and by traversing each file in the meta information stored in the Mola system, obtains listing information slice_list1 of each data slice that may accessed through the meta information, and by traversing all src fields in a Reference table of the MYSQL system, obtains listing information slice_list2 of each data slice that may accessed, and considers the slice_list1 and slice_list2 as data access information.

Further referring to FIG. 2, the second determining means 4, based on the access data information, determines the data to be cleared in said all data slices to perform data clearing operation for the data to be cleared.

Specifically, the second determining means 4 considers one or more data slices that cannot be accessed through the meta information among all data slices to be processed, as data to be cleared.

Preferably, the second determining means 4 determines the data to be cleared by comparing all data slices to be processed with said access data information and by performing left outer join operation.

According to a preferred embodiment of the present invention, the clearing apparatus further comprises means for obtaining information related to data slices that have already been uploaded by the user but not merged yet (not shown in the figure, and hereinafter referred to as "upload obtaining means").

The upload obtaining means obtains information related to data slices that have already been uploaded by the user but not merged yet.

If the determined data to be cleared includes one or more data slices that have already been uploaded by the user but not merged yet, the second determining means 4 determines not performing data clearing operation for said one or more data slices.

Illustration is further presented to the previous first example. When the user uploads a large file, BOS system provides three-step uploading to ensure that the uploading operation of the large file achieves a better effect. In the three-step uploading, the user first divides the data into multiple portions and uploads them in turn, and finally merges the uploaded multiple portions. If the user does not initiate the three-step uploading and the user does not delete these portions, these portions may be accessed in a MultiUpload Part in the BOS system. The upload obtaining means obtains listing information slice_list3 of each data slice that may be accessed in the MultiUpload Part, and regards a total of data slices corresponding to the slice_list1, slice_list2 and slice_list3 as a set B. Then, the clearing apparatus, through the left outer join operation, determines data slices which are in the set A and not in the set B as data to be cleared, and thereby performs data clearing operation thereof.

Preferably, the second determining means 4 further comprises means for transferring and storing data to be cleared in a junk file (not shown in the figure, and hereinafter referred to as "transferring and storing means"), and means for deleting a data slice which is in the junk file and has already been stored for a time period exceeding a predetermined time period, to complete data clearing operation (not shown in figure, and hereinafter referred to as "data deleting means").

The transferring and storing means transfers and stores the data to be cleared in the junk file, wherein the user may restore mis-deleted data slices in the junk file.

The data deleting means deletes a data slice which is in the junk file and has already been stored for a time period exceeding a predetermined time period, to complete data clearing operation.

To further illustrate the aforesaid first example, the transferring and storing means transfers and stores data to be cleared to a trash table, and if there occurs mis-deletion, the mis-deleted data slices may be restored in the trash table. After a predetermined time period, the data deleting means clears content in the trash table to complete data clearing operation.

According to the solution of the present invention, deleting the meta information of the corresponding file when the user initiates the deletion operation and performing clearing in the cloud storage system avoids likely deletion failure in the conventional manner of directly deleting the data information of the file, thereby reducing the storage space occupied by trash data and improving a resource utilization rate and a load level of the system.

According to a preferred embodiment of the present invention, the cloud storage system comprises a plurality of processing nodes working independently and a central node; when the clearing apparatus is included in the processing nodes, the clearing apparatus further comprises transmitting means (not shown in the figure, and hereinafter referred to as "transmitting means").

After completing execution of the data clearing operation, the transmitting means transmits corresponding processing result information to a device as the central node so that the central node processes the processing result information from each processing node.

The processing result information may include identifier information, number information, clearing completion time and the like of data slices that have been cleared.

For example, FIG. 3 illustrates an exemplary cloud storage system according to the present invention. Referring to FIG. 3, the cloud storage system comprises three cloud storage devices as processing nodes, and one cloud storage device as the central node. After having completed execution of data clearing operation, the processing nodes send corresponding processing result information to the device as the central node so that the central node processes the processing result information from each processing node.

According to the preferred embodiment, all data are distributed in a distributed multi-thread manner to a plurality of nodes for processing respectively, and processing progress and result of each node is managed on the central node to uniformly obtain the execution result thereof, thereby avoiding a lot of inter-device interaction generated upon determining data to be cleared, reducing network consumption, lessening the load of devices and improving the efficiency.

Software program of the present invention may be executed by a processor to implement said steps or functions in the preceding text. Similarly, software program (including related data structure) of the present invention may be stored in a computer-readable recording medium, e.g., RAM, magnetic or optical drive or floppy disk or similar device. In addition, some steps or functions of the present invention may be implemented by using hardware, e.g., a circuit cooperating with the processor to execute functions or steps.

In addition, a portion of the present invention may be applied as a computer program product, e.g., a computer program instruction, which when being executed by the computer, may invoke or provide the method and/or technical solution according to the present invention through operations of the computer. The program instruction of invoking the method of the present invention might be stored in a fixed or movable recording medium, and/or transmitted through data streams in broadcast or other signal carrying media, and/or stored in a working memory of a computer device running according to the program instruction. Here, an embodiment according to the present invention comprises an apparatus which comprises a memory for storing computer program instructions and a processor for executing program instructions, wherein when the computer program instruction is executed by the processor, the apparatus is triggered to run on the method and/or technical solution according to multiple embodiments of the present invention.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims, instead of the above depiction. Thus, all variations intended to fall into the meaning and scope of equivalent elements of the claims should be covered within the present invention. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

What is claimed is:

1. A method for clearing data in a cloud storage system, wherein a cloud storage system slices each user's data into a plurality of independent data slices according to a specific size for storage, the method comprises the following steps:
   deleting meta information of a data slice corresponding to a file upon detecting that a user is deleting the file;
   wherein, the method comprises the following steps:
   exporting all data slices to be processed when data needs to be cleared;
   by traversing each file in the meta information, determining each data slice that may be accessed through the meta information and thereby obtaining corresponding access data information;
   based on the access data information, determining the data to be cleared in said all data slices to perform data clearing operation for the data to be cleared,
   wherein the method comprises the following steps:
   obtaining information related to data slices that have already been uploaded by the user but not merged yet:
   wherein the step of, based on the access data information, determining the data to be cleared in said all data slices to perform data clearing operation for the data to be cleared comprises the following step:
   if the determined data to be cleared includes one or more data slices that have already been uploaded by the user but not merged yet, determining not performing data clearing operation for said one or more data slices.

2. The method according to claim 1, wherein the access data information comprises listing information, and the step of by traversing each file in the meta information, determining each data slice that may be accessed through the meta information and thereby obtaining corresponding access data information comprises the following step:
   by traversing each file in the meta information, obtaining the listing information of each data slice that may be accessed through the meta information.

3. The method according to claim 2, wherein the step of, by traversing each file in the meta information, determining each data slice that may be accessed through the meta information and thereby obtaining corresponding access data information comprises the following steps:

if a size of a file object exceeds a predetermined threshold, respectively obtaining a portion of listing information corresponding to each portion of the file object;

merging the obtained portions of listing information to thereby obtain the listing information of each data slice corresponding to the file object.

4. The method according to claim 1, wherein the cloud storage system stores a small file smaller than the predetermined threshold in the meta information, and wherein the step of, by traversing each file in the meta information, determining each data slice that may be accessed through the meta information and thereby obtaining corresponding access data information comprises the following steps:

by traversing file objects except for the small file in the meta information, determining each data slice that may be accessed through the meta information.

5. The method according to claim 1, wherein the step of, based on the access data information, determining the data to be cleared in said all data slices to perform data clearing operation for the data to be cleared comprises the following step:

determining the data to be cleared by comparing all data slices to be processed with said access data information and by performing left outer join operation.

6. The method according to claim 1, wherein the step of, based on the access data information, determining the data to be cleared in said all data slices to perform data clearing operation for the data to be cleared comprises the following step:

transferring and storing the data to be cleared in a junk file, wherein the user may restore mis-deleted data slices in the junk file;

deleting a data slice which is in the junk file and has already been stored for a time period exceeding a predetermined time period, to complete data clearing operation.

7. The method according to claim 1, wherein the cloud storage system comprises a plurality of processing nodes working independently and a central node, and the method is executed by the clearing apparatus included in the processing nodes, the method further comprising the following steps:

after completing execution of the data clearing operation, sending corresponding processing result information to a device as the central node so that the central node processes the processing result information from each processing node.

8. A device, comprising:

one or more processors;

a memory;

one or more programs, which are stored in the memory, and execute the following operation when executed by the one or more processors:

deleting meta information of a data slice corresponding to a file upon detecting that a user is deleting the file;

wherein, the operation comprises:

exporting all data slices to be processed when data needs to be cleared;

by traversing each file in the meta information, determining each data slice that may be accessed through the meta information and thereby obtaining corresponding access data information;

based on the access data information, determining the data to be cleared in said all data slices to perform data clearing operation for the data to be cleared, wherein the operation comprises:

obtaining information related to data slices that have already been uploaded by the user but not merged yet;

wherein the operation of, based on the access data information, determining the data to be cleared in said all data slices to perform data clearing operation for the data to be cleared comprises:

if the determined data to be cleared includes one or more data slices that have already been uploaded by the user but not merged yet, determining not performing data clearing operation for said one or more data slices.

9. The device according to claim 8, wherein the access data information comprises listing information, and the operation of by traversing each file in the meta information, determining each data slice that may be accessed through the meta information and thereby obtaining corresponding access data information comprises:

by traversing each file in the meta information, obtaining the listing information of each data slice that may be accessed through the meta information.

10. The device according to claim 9, wherein the operation of, by traversing each file in the meta information, determining each data slice that may be accessed through the meta information and thereby obtaining corresponding access data information comprises:

if a size of a file object exceeds a predetermined threshold, respectively obtaining a portion of listing information corresponding to each portion of the file object;

merging the obtained portions of listing information to thereby obtain the listing information of each data slice corresponding to the file object.

11. The device according to claim 8, wherein the cloud storage system stores a small file smaller than the predetermined threshold in the meta information, and wherein the operation of, by traversing each file in the meta information, determining each data slice that may be accessed through the meta information and thereby obtaining corresponding access data information comprises:

by traversing file objects except for the small file in the meta information, determining each data slice that may be accessed through the meta information.

12. The device according to claim 8, wherein the operation of, based on the access data information, determining the data to be cleared in said all data slices to perform data clearing operation for the data to be cleared comprises:

determining the data to be cleared by comparing all data slices to be processed with said access data information and by performing left outer join operation.

13. The device according to claim 8, wherein the operation of, based on the access data information, determining the data to be cleared in said all data slices to perform data clearing operation for the data to be cleared comprises:

transferring and storing the data to be cleared in a junk file, wherein the user may restore mis-deleted data slices in the junk file;

deleting a data slice which is in the junk file and has already been stored for a time period exceeding a predetermined time period, to complete data clearing operation.

14. The device according to claim 8, wherein the cloud storage system comprises a plurality of processing nodes working independently and a central node, and the operations are executed by the clearing apparatus included in the processing nodes, the operation further comprising:

after completing execution of the data clearing operation, sending corresponding processing result information to a device as the central node so that the central node processes the processing result information from each processing node.

15. A nonvolatile computer storage medium, stored with one or more programs, which, when executed by an apparatus, make the apparatus to execute the following operation:
   deleting meta information of a data slice corresponding to a file upon detecting that a user is deleting the file;
   wherein, the operations comprise:
   exporting all data slices to be processed when data needs to be cleared;
   by traversing each file in the meta information, determining each data slice that may be accessed through the meta information and thereby obtaining corresponding access data information;
   based on the access data information, determining the data to be cleared in said all data slices to perform data clearing operation for the data to be cleared,
   wherein the operation comprises:
   obtaining information related to data slices that have already been uploaded by the user but not merged yet;
   wherein the operation of, based on the access data information, determining the data to be cleared in said all data slices to perform data clearing operation for the data to be cleared comprises:
   if the determined data to be cleared includes one or more data slices that have already been uploaded by the user but not merged yet, determining not performing data clearing operation for said one or more data slices.

* * * * *